3,318,708
PROCESS FOR PRODUCING QUICK-COOKING LEGUMES
Louis B. Rockland, Pasadena, Robert J. Hayes, Azusa, Eugene Metzler, Glendale, and Le Roy Binder, Pasadena, Calif., assignors to the United States of America as represented by the Secretary of Agriculture
No Drawing. Filed Mar. 26, 1964, Ser. No. 355,127
8 Claims. (Cl. 99—98)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of processes for producing quick-cooking products from edible seeds of legumes, e.g., conventional dry beans or peas. Further objects of the invention will be evident from the following description wherein parts and percentages are by weight unless otherwise specified.

The problems with which the invention is concerned and application of the invention are explained below, having particular reference to beans. It is to be understood, however, that a similar situation is encountered with the seeds of other plants of the pea family and in its broad aspect the invention is applicable to legume seeds in general, typically seeds of the genus Phaseolus including the common beans such as large white, small white, pinto, red kidney, lima, etc.; the genus Pisum including smooth and wrinkled peas; the genus Vigna including the black-eye beans (or blackeye peas as they are sometimes termed); the genus Lens including lentils; the genus Cicer including garbanzo or chick-peas; etc.

Dry beans, sometimes termed shell beans, are conventionally produced by the following technique: The bean plants are grown in the usual manner, allowing them to remain in the field until the beans in the pod are mature and dry. The beans are then harvested, the individual beans being separated from the pods and vines. The harvested beans are then subjected to cleaning and sorting operations and packaged for sale. Although the beans in this form are a valuable food material, they have the disadvantage that their preparation for the table requires a long time. Thus the beans must be first soaked overnight in water and then cooked for anywhere from one to four hours or more to make them tender. To avoid these long periods of soaking and cooking it has been advocated that the beans be given certain treatments so that the consumer can prepare them for the table in a relatively short time. For example, it has been advocated that the beans be given a soak in water with or without a partial cooking or paraboiling and then dried and packaged for sale. Although such procedures do shorten the cooking time, they do not yield a satisfactory product from various standpoints. For one thing, the individual beans do not remain intact; they are cracked or split and in the case of some varieties of beans—limas, for example—each pair of cotelydons opens out to exhibit what may be termed a butterfly appearance. Such disruption of the natural structure of the seeds is not only unsightly but when the products are cooked, they form a mush or soup of disintegrated bean material. As a consequence the known products are suitable only for preparing soup dishes; they are totally useless where the aim is to prepare a dish containing the individual, integral beans.

The procedure in accordance with the invention obviates the disadvantages discussed above. Thus the products of the invention have a primary advantage in that they are quick-cooking. To prepare them for the table, they are added to boiling water and after simmering for a period of about 20 to 40 minutes are tender and ready for consumption. Moreover, this quick-cooking character is attained without significant damage to the individual beans. They retain their original structure with no cracking, splitting, or butterflying. As a consequence, they have a very attractive appearance and, moreover, when cooked still retain the integral character of the individual beans. Thus the products of the invention are eminently suited for the preparation of dishes wherein the structure of the individual beans needs to be maintained. It is to be noted that in many varieties of ordinary dry beans, for example, Lima beans, the skin is the portion most impervious to moisture and which offers the greatest resistance to softening during cooking. However in the products of the invention, the skin as well as the cotelydons take up water readily and acquire a proper tenderness for eating with a very short cooking time. In addition to having the property of being quick-cooking and retaining their original structure, the products of the invention exhibit an excellent natural color and flavor, and may be kept for long periods of time without losing their quick-cooking character. (Many known products have a tendency to revert on storage, i.e., to lose their capability of being cooked in a short period of time.)

In essence, the production of quick-cooking beans in accordance with the invention involves the following steps:

I. Dry beans are hydrated, using (1) a special operational technique and (2) a special aqueous hydrating medium.

II. The hydrated beans are then dried. If desired, the hydrated beans may be washed with water prior to this drying step.

A basic novel feature of the present invention concerns the operational technique by which the dry beans are hydrated. Thus the dry beans are placed in a vessel together with an excess of the hydrating medium, for example, about 2.5 to 5 times the weight of the beans. The vessel is closed and a vacuum is applied, then released. This cycle involving application of vacuum and release of vacuum is repeated several times, usually 2 to 20 times, depending on the hydration resistance of the beans, over a period of about 5 to 60 minutes.

Our investigations have shown that such vacuum impregnation or hydration yields results entirely different from those obtained with ordinary soaking. Thus where dry beans are simply soaked in water, the penetration of water is strictly from the outer surface of the beans toward the inside. This type of penetration is very slow and, moreover, it causes the establishment of stresses and strains in the seeds so that when they are subsequently dried they crack and split. In the procedure of the invention the entry of the water follows an entirely different course. As a first step, the withdrawal of air from the bean tissues by the vacuum, followed by release of the vacuum causes the liquid to rush into the space between the skin and the cotyledon, the liquid entering this space through minute openings in the skin and/or through the hilum or the micropyle. Thus as a first step the water is actually placed within the structure of the bean. Once the water is thus inside it can diffuse readily into the various structures of the bean. For example, it diffuses inwardly into the cotyledon and outwardly through the various layers of the skin. It is of interest to note that the skin is composed of several layers and the outermost is the most impervious to liquids. As a consequence moisture can penetrate more easily from the innermost to the outermost layer of the skin than it can in the reverse direction. Another important factor is that when the water enters into the bean by the vacuum treatment it contacts the innermost (water-permeable) layer of the skin and quickly makes the skin plastic so that it can expand without developing any tendency to rupture. As a matter of fact, after applying the several cycles of vacuum and release of vacuum, it is noted that each bean is in a swollen distended condition. This is caused by the swelling of the skin and the establishment of a pool of liquid inside the skin and surrounding the cotyledon. When this state is reached the beans are simply allowed to remain in contact with the hydrating medium to complete their hydration. The time required for completing the hydration will vary with such factors as the size, variety, moisture content, post-harvest age, and time-temperature history of the beans. In general, a time of about 2 to 24 hours is used. In any particular case, the time of hydration is readily determined by simply feeling the beans from time to time as they are soaking. Thus when the cotyledons have taken up so much water they have swelled to fit the swollen skin and the skin no longer feels loose, the procedure is complete. It is to be noted that the hydration of the beans is conducted at ambient (room) temperature or below. Increased temperature will increase the rate of hydration but cause a mottling of the beans and is hence avoided.

After the beans have been hydrated as above described, they may be washed with water to remove the hydrating medium from the surface of the beans. This washing is conveniently carried out by placing the hydrated beans on a screen and spraying them with water for a short time. Additives may be incorporated into the wash water to accomplish certain ends. As an example, glycerine may be added in a concentration of about 5 to 10% whereby to plasticize the skins, that is, keep them in a soft or elastic condition. Also, a minute amount of ascorbic acid may be incorporated in the wash water as a means of minimizing oxidation of oxidizable components in the skin when the products are stored before use.

Following washing, or directly after hydration, the beans are dried. This is conveniently effected by placing the beans on trays and exposing them to heated air. Generally, the air temperature and conditions of treatment are selected so that the drying takes place relatively slowly. Normally an air temperature of 100 to 180° F., preferably 100–140° F., is used and circulation of the air is restricted to avoid too rapid drying which could cause checking or cracking of the beans. In any event, the drying is continued until the beans contain from about 9.5 to 10.5% moisture. This moisture range is preferred as providing an optimum level for retention of quality during storage since moisture levels above the preferred tend to encourage reversion (loss of quick-cooking character) and moisture levels below the preferred one tend to encourage flavor changes associated with oxidative changes of labile components. Following drying, the products are packaged, preferably under vacuum or with replacement of air by nitrogen.

As noted briefly above, a feature of the invention is that a special medium is used in the hydration step. Although this medium is largely water, it contains certain additives which provide advantageous results which could not be obtained with water alone. These useful effects of the additives are exerted during the hydration step and/or subsequent thereto. Thus since the additives are present in the medium which penetrates throughout the beans when they are hydrated, the additives may exert their desired activity at this stage. Moreover, since the additives remain in the beans after washing (or after washing and drying), they remain distributed throughout the bean tissue where they can exert their influence in subsequent treatment of the products, for example, in storage, cooking, and consumption thereof.

A primary consideration is that the hydration medium contains one or more tenderizing agents. These agents contribute largely to the goal of attaining a product that is quick-cooking, i.e., one that can be prepared for the table by heating in water for a period less than an hour. Thus during the hydration step, these agents cause a tenderizing of the bean tissue, particularly of the skins. Such action is, of course, very desirable because the skins exhibit an especially tough and impervious nature. Moreover, when the products of the invention are cooked, the tenderizing agents distributed in the bean tissue cooperate with the applied heat and moisture to cause a further and rapid tenderizing of both cotyledons and skins, yet without such a violent action as to cause any substantial sloughing or other physical disruption of the individual beans. Such a desirable action is attained by having present in the hydration medium, primarily the following: sodium chloride and a chelating agent. The sodium chloride has the principal effect of softening the skins. Usually, the sodium chloride is present in the hydrating medium in a concentration of about from 1 to 3%. The chelating agent exerts a variety of useful effects, including the following: (1) It softens the pellicle or skin. (2) It aids in the solubilization of proteins, such as those in the cotyledons. (3) It acts as a buffer to maintain pH. (4) It facilitates uniform penetration of additives into the centers of the cotyledons, so that the final products have a uniformly smooth texture. (5) It tends to lighten the color of the product. With respect to the last item, the following will further explain this point: As hereinafter explained, an alkali metal carbonate, or bicarbonate, is a desirable constituent of the hydrating medium of the invention. However, when such agents are applied to such items as large, white Lima beans, the beans take on a green or yellow-green color. This undesirable color change is prevented when a chelating agent is present with the carbonate or bicarbonate; in such event, the beans retain their normal light color. In a practice of the invention, various conventional chelating agents may be used such as the alkali metal salts of ethylenediamine tetraacetic acid (hereinafter referred to as EDTA), alkali metal pyrophosphates or triployphosphates, citric acid or its alkali metal salts, etc. Generally, the chelating agent is added to the hydrating medium in a concentration of about from 0.25 to 5%. Particularly preferred as the chelating agent is a single EDTA salt, or a mixture of EDTA salts, which contain both sodium plus calcium or magnesium or all three of these cations. Addition of the calcium and/or magnesium is believed to temper the action of EDTA so that during cooking the skins become tenderized without danger of complete solubilization or disintegration. Typical examples of such agents are the following:

$Na_4$ salt of EDTA and the $Na_2Ca$ salt of EDTA in equal proportions.

One part of $Na_4$ salt of EDTA and one-half part of each of the $Na_2Ca$ and $Na_2Mg$ salts.

One part of $Na_4$ salt of EDTA, 0.7 part of the $Mg_2$ salt, and 0.25 part of the $Na_2Ca$ salt.

For best results, it is preferred that the hydrating medium be slightly alkaline, that is, have a pH of about 9. Depending on the chelating agent selected, this value may be attained directly, or it may be necessary to add an alkaline material, for example, sodium hydroxide, or more preferably, sodium carbonate or bicarbonate. The carbonate, or bicarbonate, not only acts as an alkaline agent and buffer but also acts as a protein dissociating, solubilizing or tenderizing agent. Generally, excellent results are attained with sodium bicarbonate and the preferred form of the hydrating medium contains this component in a concentration of about from 0.1 to 1%, more preferably .5 to .75%.

To assist in the tenderizing effect, it is preferred that the hydrating medium additionally contain a trace—i.e., about 0.01 to 0.05%—of a reducing agent, preferably one having a sulfhydryl group. Typical of the components which may be used are alkali metal sulphides, mercapto-acetic acid or its alkali metal salts, mercaptopropionic acid or its alkali metal salts, thioglycollic acid or its alkali metal salts, thiodipropionic acid or its alkali metal salts, cysteine, etc. We believe that the reducing agent acts as a tenderizer by causing (during the cooking) the proteins to attain an extended chain formation which is more soluble (tender) than the native, globular form. The reducing agents also act as protective agents during storage of the products by preventing oxidation of sulphur-containing groups in the proteins of the beans, i.e., by preventing such oxidations as thiols to disulphides; thiols or sulphides to sulphoxides or sulphones, etc. It is also hypothesized that the reducing agent may reduce the flatulent effect of the products by reducing oxidized derivatives (i.e., sulphides or disulphides) of sulphur-containing amino acids or sulphur-containing peptides to the corresponding thiol forms.

During cooking of the products, it is, of course, essential that moisture penetrates throughout the bean tissue. For this reason the preferred forms of the hydrating medium will contain a minor proportion—for example, 0.05 to 0.5%—of a conventional edible-grade surface agent. Also, we have found that addition of a surface-active agent improves the final appearance of the treated, dried beans. Typical examples of surface-active compounds are given below:

Fatty acid monoesters of inner ethers of hexitols, the fatty acids containing at least six carbon atoms. Illustrative of this class are sorbitan monolaurate, sorbitan monomyristate, sorbitan monopalmitate, sorbitan monostearate, sorbitan monooleate, and sorbitan monolinoleate. The corresponding fatty acid esters of mannitan may also be used.

Condensation products of ethylene oxide with sorbitan or monnitan monofatty acid esters. Typical among these compounds are ethylene oxide condensates of sorbitan monolaurate, sorbitan monomyristate, sorbitan monopalmitate, sorbitan monostearate, sorbitan monooleate, and the like. These condensates may contain anywhere from 6 to 60 moles of ethylene oxide per mole of sorbitan monoester.

Condensation products of ethylene oxide with long-chain carboxylic acids, that is, compounds of the formula $$R-CO-(OC_2H_4)_n-OH$$

where R—CO is the acyl radical of a fat acid such as lauric, palmitic, oleic, stearic, etc, and $n$ has a value from 6 to 60.

Condensation products of ethylene oxide with long-chain aliphatic alcohols, i.e., compounds of the formula $$R-(OC_2H_4)_n-OH$$

wherein R is the hydrocarbon radical of a long-chain alcohol such as dodecyl, tetradecyl, hexadecyl, octadecyl, oleyl, etc. and $n$ has a value from 6 to 60.

Polyglycerol esters of higher fatty acids such as lauric, palmitic, stearic, oleic, etc.

Mono- or di-esters of sucrose and fatty acids containing at least six carbon atoms. Illusrtative compounds of this class are sucrose monolaurate, sucrose monomyristate, sucrose monopalmitate, sucrose monostearate, sucrose monooleate, sucrose dilaurate, sucrose dimyristate, sucrose dipalmitate, sucrose distearate, sucrose dioleate, and the like.

Monoglycerides of higher fatty acids, for example, glycerol monolaurate, glycerol monomyristate, glycerol monopalmitate, glycerol monostearate, glycerol monooleate.

Diacetyltartaric acid esters of fatty acid monoglycerides, e.g., diacetyltartaric acid ester of stearic, palmitic, or oleic acid monoglyceride.

Since the products of the invention may be stored for substantial periods before use, the hydrating medium may additionally contain a small percentage, for example, about 0.001 to 0.005%, of a conventional antioxidant, thus to prevent oxidative deterioration of flavor during storage. For this purpose, one could add to the hydrating medium any of the conventional antioxidants such as nordihydroguaiaretic acid; butylated hydroxy anisole; butylated hydroxy toluene; esters of gallic acid, e.g., propyl, butyl, hexyl, octyl, etc. esters; gum guaiac, ascorbic acid and isoascorbic acid and their esters, e.g., ascorbyl palmitate, stearate, etc.; quinoline derivative such as 6-ethoxy-2,2,4-trimethyl-1,2-dihydroquinoline, etc.

As another item may be mentioned the fact that sometimes foaming is encountered when beans are cooked. This foaming tendency may be suppressed, if desired, by incorporating as the hydration medium a trace of antifoam agent such as a commercial food-grade silicone.

To avoid micobiological action in the hydration medium or in the treated beans, one may add to the medium a small percentage of a conventional preservative such as sodium or potassium sorbate, sodium benzoate, or the like.

A typical basic formula for the hydration medium is water containing the following ingredients:

| | Percent |
|---|---|
| NaCl | 1.5 |
| EDTA, Na$_4$ salt | 1 |
| EDTA, Na$_2$Ca salt | 1 |

A formulation which provides better results than that disclosed above contains, plus water, the following ingredients:

| | Percent |
|---|---|
| NaCl | 1.5 |
| Na$_2$S·9H$_2$O | .05 |
| EDTA, Na$_4$ salt | 1.0 |
| EDTA, Na$_2$Ca salt | 0.5 |
| EDTA, Na$_2$Mg salt | 0.5 |
| Polyoxyethylene sorbitan stearate | 0.25 |

A particularly preferred formulation of the hydrating medium is disclosed in the examples below.

The invention is further demonstrated by the following illustrative examples:

Examples 1 to 12

A solution was prepared containing water and the following ingredients:

| | Percent |
|---|---|
| NaCl | 1.5 |
| EDTA, Na$_4$ salt | 1.0 |
| EDTA, Na$_2$Mg salt | 1.0 |
| EDTA, Na$_2$Ca salt | 0.25 |
| NaHCO$_3$ | 0.25 |
| Na$_2$S·9H$_2$O | 0.025 |
| Polyoxyethylene sorbitan stearate | 0.25 |
| Butylated hydroxyanisole | 0.003 |
| Butylated hydroxytoluene | 0.003 |

The pH of the solution was 9.0.

Several different lots of dried beans and dried peas were treated with the above solution, using the following technique in each case. The dried beans (or peas) were placed in a vessel together with enough of the solution to cover them. The vessel was closed and connected to a source of vacuum. The vacuum was maintained for about a minute, then the vacuum was released. After about a half minute the vacuum was again applied, held for a minute, then released, and so on. In all 10 cycles of vacuum application and release were used. The system was then allowed to stand, at room temperature and at atmospheric pressure, with the beans( or peas) in contact with the solution until the cotyledons swelled to fill the swollen skins. The hydration time applied in each case is given in the following table. (It is to be noted that the time of hydration varies, depending on many factors, as hereinabove explained, and it is not maintained that the particular times used are necessarily applicable to other lots of legume seeds.) Following residence in the hydration medium, the products were dried in a current of air at 140° F. until their moisture content was 10%. The products were then ready for packaging or use. It was observed that in all cases the seeds retained their structure intact with no noticeable cracking or splitting.

To test the cooking quality of the products, each lot thereof was added to boiling water and simmered until the products reached a standard tenderness, typical of properly cooked beans. In all cases the cooked product had an excellent flavor and the seeds were essentially intact with no significant mushing or sloughing. The results are given in the following table.

| Example | Variety or type | Time of residence in hydrating medium, prior to drying, hours | Time required to cook product, minutes |
|---|---|---|---|
| 1 | Lentil | 6 | 13 |
| 2 | Lima, large white | 4 | 25 |
| 3 | Lima, baby | 6.5 | 25 |
| 4 | Beans, Pinto | 6.5 | 30 |
| 5 | Peas, whole | 18 | 35 |
| 6 | Beans, red kidney | 6 | 35 |
| 7 | Beans, red | 24 | 35 |
| 8 | Beans, pink | 24 | 35 |
| 9 | Beans, small white, Calif | 6 | 35 |
| 10 | Beans, Great Northern | 18 | 35 |
| 11 | Blackeye | 18 | 45 |
| 12 | Soybean | 24 | 50 |

The quick-cooking nature of the products is illustrated by the following: The product of Example 2, as above described, was cooked to standard tenderness in 25 minutes. In contrast, the original dry Lima beans, from which this product was prepared, required first an overnight soak in water, then cooking for 80 minutes to bring both the cotyledons and skins to the same degree of tenderness as obtained with the product of Example 2 in a 25-minute cook with no soaking prior to cooking.

*Example 13*

Solutions were prepared containing water and the following ingredients:

| | |
|---|---|
| NaCl | 1.5%. |
| EDTA, Na$_4$ salt | 1%. |
| EDTA, Na$_2$Mg salt | 1%. |
| EDTA, Na$_2$Ca salt | 0.25%. |
| Polyoxyethylene sorbitan monostearate | 0.25%. |
| Butylated hydroxyanisole | 0.003%. |
| Butylated hydroxytoluene | 0.003%. |
| NaHCO$_3$ | Variable (as specified below). |
| Na$_2$S·9H$_2$O | 0.025%. |

Large, white Lima beans were treated with the solutions, using the procedure described above in Examples 1 to 12. Residence time in the hydrating solution was 6 hours. Drying was also as described above.

The various dried products were evaluated by adding them to boiling water and simmering until the products reached a standard tenderness, typical of properly cooked beans. Also, after a 20-minute cook, the products tested in a shear press. The results are tabulated below:

| Run | Proportion of NaHCO$_3$ in hydrating medium, percent | Cooking time of product, min. | Shear press evaluation,* after 20-minute cook |
|---|---|---|---|
| 1 | 0.25 | 36 | 1.41 |
| 2 | 0.50 | 35 | 1.22 |
| 3 | 0.75 | 28 | 1.16 |
| 4 | 1.00 | 27 | 0.76 |

*The values given are proportional to the work required to shear the whole beans.

Having thus described the invention, what is claimed is:

1. A method for preparing quick-cooking legume seeds from edible dry legume seeds which comprises subjecting the seeds while they are in contact with an aqueous hydrating medium to a vacuum, then releasing the vacuum, repeating the cycle of vacuum application and release until the skins of the seeds are swollen by entry of the medium into the seeds, holding the seeds in contact with the said medium at ambient temperature and atmospheric pressure for a period long enough for the cotyledons to swell until they fill the swollen skins, and drying the resulting products to a moisture content of about from 9.5 to 10.5%, wherein the said aqueous hydrating medium contains sodium chloride in a concentration of about from 1 to 3%, a chelating agent in a concentration of about from 0.25 to 5%, and has a slightly alkaline pH.

2. The process of claim 1, wherein the aqueous hydrating medium contains sodium chloride in a concentration of about from 1 to 3%, a salt of ethylene diamine tetraacetic acid in a concentration of about from 0.25 to 5%, and has a slightly alkaline pH.

3. The process of claim 1, wherein the aqueous hydrating medium contains sodium chloride in a concentration of about from 1 to 3%, a mixture of salts of ethylene diamine tetraacetic acid including sodium, calcium and magnesium salts of said acid, in a concentration of about from 0.25 to 5%, and has a slightly alkaline pH.

4. The process of claim 1 wherein the said aqueous hydrating medium includes salt, a chelating agent, and a sulfhydryl-containing reducing agent, and has a slightly alkaline pH.

5. The process of claim 1 wherein the said aqueous hydrating medium includes salt, a chelating agent, a sulfhydryl-containing reducing agent, a surface-active agent, and has a slightly alkaline pH.

6. A method for preparing quick-cooking legume seeds from edible dry legume seeds which comprises subjecting the seeds while they are in contact with an aqueous hydrating medium to vacuum, then releasing the vacuum, repeating the cycle of vacuum application and release until the skins of the seeds are swollen by entry of the medium into the seeds beneath the skins, holding the seeds in contact with said medium at ambient temperature and atmospheric pressure for a period long enough for the cotyledons to swell until they fill the swollen skins, and drying the resulting products to a moisture content of about from 9.5 to 10.5%, the said aqueous hydrating medium containing the following ingredients:

| | |
|---|---|
| NaCl | About 1 to 3%. |
| Na, Ca, and Mg salts of EDTA | About 0.25 to 5%. |
| NaHCO$_3$ | About 0.1 to 1%. |
| Na$_2$S·9H$_2$O | About 0.01 to 0.05%. |
| Surface active agent | About 0.05 to 0.5%. |
| Antioxidant | About 0.001 to 0.005%. |

7. The process of claim 6 wherein said seeds are beans.
8. The process of claim 6 wherein said seeds are peas.

References Cited by the Examiner

UNITED STATES PATENTS

| | | | |
|---|---|---|---|
| 1,920,107 | 7/1933 | Richardson | 99—80.1 |
| 1,987,304 | 1/1935 | Menke | 99—80.1 |
| 2,227,634 | 1/1941 | Dalin | 99—80.1 |

A. LOUIS MONACELL, *Primary Examiner.*

RAYMOND N. JONES, *Examiner.*

S. E. HEYMAN, *Assistant Examiner.*